(12) United States Patent
Al Tamimi et al.

(10) Patent No.: US 12,217,467 B2
(45) Date of Patent: Feb. 4, 2025

(54) SYSTEM AND METHOD FOR IMAGE COMPRESSION BASED ON MACHINE LEARNING

(71) Applicant: Averroes.ai Inc., San Mateo, CA (US)

(72) Inventors: Omar Ahmad Abdo Al Tamimi, Amman (JO); Tareq Aljaber, Brentwood, CA (US)

( * ) Notice: Subject to any disclaimer, the term of this patent is extended or adjusted under 35 U.S.C. 154(b) by 590 days.

(21) Appl. No.: 17/571,538

(22) Filed: Jan. 10, 2022

(65) Prior Publication Data

US 2022/0222865 A1 Jul. 14, 2022

Related U.S. Application Data

(60) Provisional application No. 63/135,552, filed on Jan. 8, 2021.

(51) Int. Cl.
*G06T 9/00* (2006.01)
*G06N 3/045* (2023.01)
*G06T 3/4046* (2024.01)

(52) U.S. Cl.
CPC ............. *G06T 9/002* (2013.01); *G06N 3/045* (2023.01); *G06T 3/4046* (2013.01)

(58) Field of Classification Search
CPC ........ G06T 9/002; G06T 3/4046; G06N 3/045

USPC ........................................................ 382/232
See application file for complete search history.

(56) References Cited

PUBLICATIONS

Yan et al, "Deep AutoEncoder-based Lossy Geometry Compression for Point Clouds" arXiv 2019 (Year: 2019).*
Lilian Weng, "From Autoencoder to Beta-VAE" Lil'Log 2019 (Year: 2019).*
Lohdefink et al "Scalar and Vector Quantization for Learned Image Compression: A Study on the Effects of MSE and GAN Loss in Various Spaces" ResearchGate 2020 (Year: 2020).*
Ooord et al "Neural Discrete Representation Learning" NIPS 2017 (Year: 2017).*

* cited by examiner

*Primary Examiner* — Mark Roz
(74) *Attorney, Agent, or Firm* — Barry Choobin; Patent 360

(57) ABSTRACT

A system and method for compressing and decompressing image data, which provides better compression and minimal representation of the input image with minimal loss compared to previous Deep Learning codecs. The system can provide for quantization during training, flexible addition of filters, and conditional complexity of image compression. The Deep Learning codec generates codes that are directly usable with Machine Learning algorithms, thus boosting the performance of Machine Learning algorithms.

14 Claims, 6 Drawing Sheets

| Test Image | Butterfly | Camera man | House | Lena | Peppers | Average* |
|---|---|---|---|---|---|---|
| JPEG | 25.24 | 26.47 | 30.56 | 30.41 | 30.14 | 28.564 |
| Jiang's [1] | 28.60 | 27.44 | 33.25 | 33.11 | 31.83 | 30.846 |
| NQAE | 29.25 | 29.12 | 31.13 | 33.79 | 31.93 | 31.044 |

*All units are in decibels (dB)

Fig. 6

| Test Image | Butterfly | Camera man | House | Lena | Peppers | Average |
|---|---|---|---|---|---|---|
| JPEG | 0.8325 | 0.7965 | 0.8183 | 0.8183 | 0.7839 | 0.7839 |
| Jiang's [1] | 0.9245 | 0.8448 | 0.8678 | 0.8838 | 0.8532 | 0.8532 |
| NQAE | 0.9362 | 0.8989 | 0.8932 | 0.9150 | 0.8631 | 0.9012 |

Fig. 7

SYSTEM AND METHOD FOR IMAGE COMPRESSION BASED ON MACHINE LEARNING

CROSS-REFERENCE TO RELATED APPLICATIONS

This application claims priority from the U.S. provisional patent application Ser. No. 63/135,552, filed on Jan. 8, 2021, which is incorporated herein by reference in its entirety.

FIELD OF INVENTION

The present invention relates to a system and method for image data processing, and more particularly, the present invention relates to a novel quantized auto-encoder neural network system and methods.

BACKGROUND

Reducing an image's size with high fidelity has long been a major challenge in the image processing industry. Data compression is critically important in the field of data science. Image data compression algorithms that are more efficient and deliver higher fidelity than the existing solutions are of great interest and commercial value. Applying machine learning to big data requires efficient data compression methods to reduce processing time. However, the compression of the image data requires reconstruction of the images, and the reconstruction process is usually lossy. In lossy image compression, information is deliberately discarded to decrease the storage space of images and videos. Any quality degradation of the reconstructed image may negatively affect the machine learning model's performance.

Feng Jiang et al., IEEE, *Transactions on circuits and systems for video technology*, Aug. 2, 2017, teaches that Deep Learning can be applied to image compression even though image compression is seen as a low-level problem for Deep Learning. They also report that, unfortunately, the rounding function in quantization is not differentiable, which brings great challenges to train deep neural networks when performing the backpropagation algorithm. However, those models still have problems and challenges: Since the quantization process is undifferentiable, the known models were unable to allow for gradient flow through the quantization process. This issue hindered the training process described in the aforementioned papers, and it required further adjustments to their solutions. The added adjustments required more training time, longer processing, and resulted in some additional loss of fidelity. Yunjin Chen et al., *Trainable Nonlinear Reaction Diffusion: A Flexible Framework for Fast and Effective Image Restoration*, IEEE transactions on pattern analysis and machine intelligence, VOL. XX, NO. XX, 2016, describes a flexible learning framework based on the concept of nonlinear reaction diffusion models for various image restoration problems. Chen acknowledged that it is generally hard to train a universal diffusion model to handle all the noise levels or all upscaling factors.

Thus, there exists an industry need for novel methods of image data compression with high fidelity.

SUMMARY OF INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a machine learning based system and method for image data compression with high fidelity.

It is another object of the present invention that the disclosed system and method can handle a large volume of image data efficiently.

It is still another object of the present invention that the system and method can provide for faster and greater compression with minimal loss of image quality.

It is a further object of the present invention to provide greater generalization as compared to the previous state-of-the-art Deep Learning codecs.

It is still a further object of the present invention to provide codes that can be directly usable with Machine Learning algorithms thus boosting the performance of Machine Learning algorithms.

In one aspect, disclosed is a system and method for compressing and decompressing image data with high fidelity. In certain implementations of the disclosed method, the compression format can be JPEG 2000, which boasts a structural similarity index measure (SSIM) of 77%, indicating a relatively low fidelity or lossy transformation, while reducing the input with a ratio of 16:1.

In one implementation, disclosed is a Deep Learning codec that provides better compression and minimal representation of the input image with minimal loss. The Deep Learning codec also returns codes that are directly usable with Machine Learning algorithms, thus boosting the performance of Machine Learning algorithms. The reduced representations by the disclosed Deep Learning codec are compatible with Deep Learning, such that one can directly use the minimized representations generated by this codec to train a model without having to decompress the minimized representations. This capability can reduce the overall size of the network, reduce the duration of the training time, and increase the generality of the Network. These minimized representations also retain spatial information due to the method and nature of the compression.

In one implementation, Greedy Training, also known as Greedy layer-wise pretraining, can provide a way to develop deep multilayered neural networks. Pretraining can be used to iteratively deepen a supervised model or an unsupervised model that can be repurposed as a supervised model. The disclosed codec model can allow users to discover certain metrics within their datasets, such as the complexity of each image or the complexity of a certain region within an image. The values of these metrics will predict the regions in an image that will incur the most losses when reconstructing the image.

The Greedy Training aspect of the instant invention allows greater compression than previous methods. In the Greedy Training method that is incorporated into this invention, the number of filters is not fixed. For a simple data set of grayscale binary images, for example, a black image with one dot, the best representation of this image would simply be the coordinates of the dot. Other systems will compress that image to a limit. On the other hand, the disclosed encoder network grows, so the compression ratio also grows depending on the performance. As the network grows, the number of filters grows, and the compression ratio grows two-fold. With a single filter, the disclosed model can have a compression ratio of 32:1, and with two filters, the model can have a compression ratio $(16 \times 2^n):1$, where n is the number of filters, an exponential growth.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

The described features, structures, or characteristics of the invention may be combined in any suitable manner in accordance with the aspects and one or more embodiments of the invention. In the following description, numerous specific details are recited to provide an understanding of various embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring the aspects of the invention.

Figure 1:
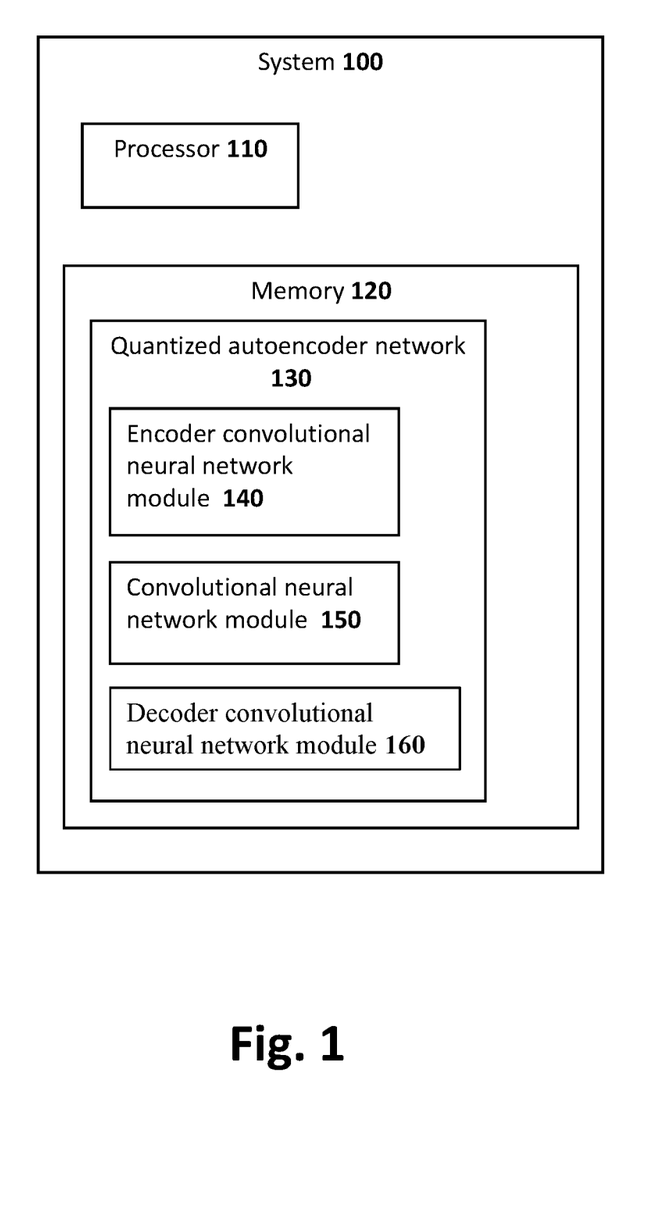
FIG. 1 is a block diagram showing an architecture of the system, according to an exemplary embodiment of the present invention.

Disclosed is a system and method that can overcome the drawbacks and challenges with the known image compression codecs by providing a codec that reduces the dimensionality of the input images while retaining spatial information. Disclosed is a Deep Learning codec that can apply a quantization operation during the training process. Referring to FIG. 1 which is a block diagram showing an exemplary embodiment of the disclosed system 100. The system 100 can include processor 110 and a memory 120 connected through a system bus (not shown). The processor 110 can be any logic circuitry that responds to, and processes instructions fetched from the memory 120. The processor can read instructions from a machine-readable or computer-readable medium (e.g., a non-transitory machine-readable storage medium) and perform one or more of the methodologies discussed herein. The memory 120 may include one or more memory chips capable of storing data and allowing any storage location to be directly accessed by the processor 110. The memory 120 can include modules which upon execution by the processor can perform one or more of the methodologies discussed herein. The modules can be a set of instructions including software, a program, an application, or other executable code for causing the processor to perform one or more of the methodologies discussed herein. The disclosed memory 120 can include a Quantized autoencoder network 130 which upon execution by the processor can provide for compression and decompression of image data with high fidelity. The Quantized autoencoder network 130, also referred to herein as the codec, can include three essential modules: the encoder convolutional neural network module 140 (the encoder network), the intermediate convolutional neural network module 150 (the bottleneck network), and the decoder convolutional neural network module 160 (the decoder network).

Figure 2:
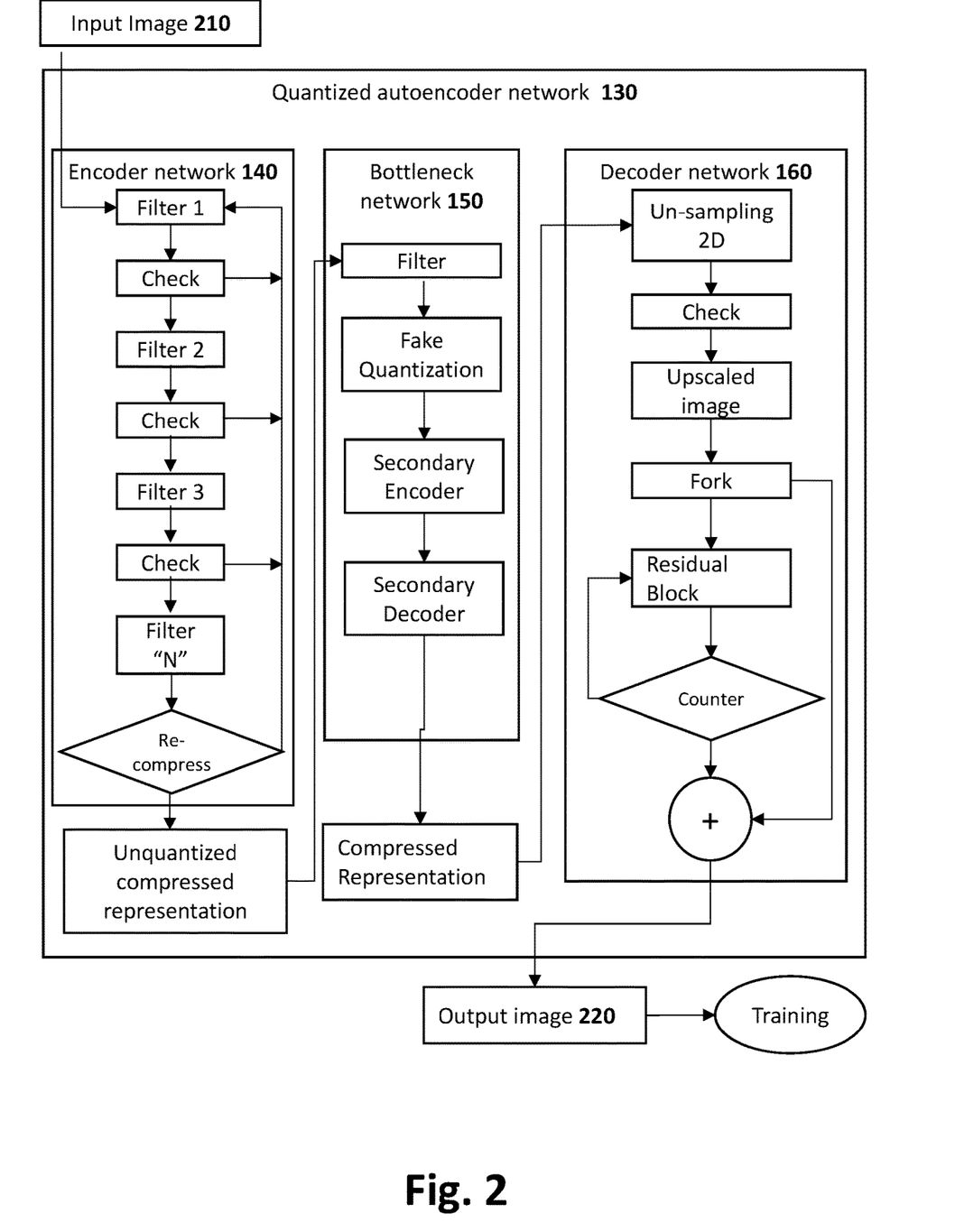
FIG. 2 is a diagram illustrating an implementation of the disclosed system and method, showing the three modules of the encoder and the major elements of each module, according to an exemplary embodiment of the present invention.
Figure 3:
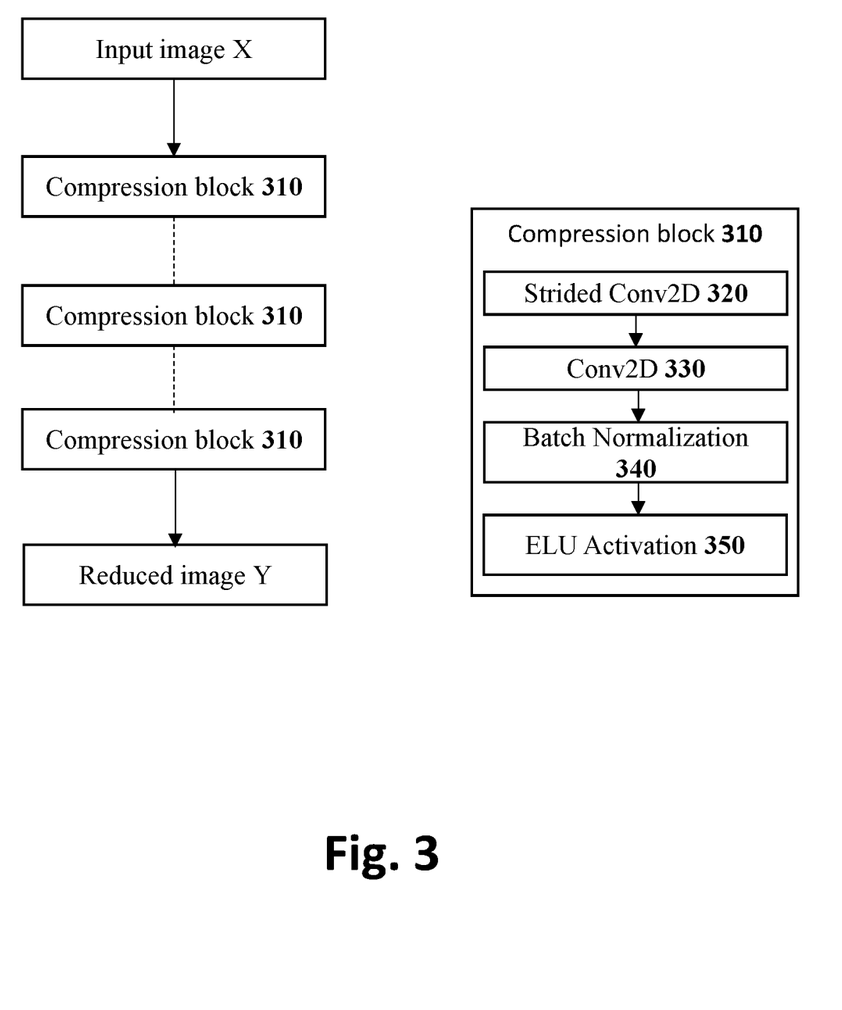
FIG. 3 is a diagram of the encoder network with its automatic expansion capabilities visualized, according to an exemplary embodiment of the present invention.

Referring to FIG. 2 which is a block diagram illustrating the methodology disclosed herein. The input image 210 can be compressed to the output image 220 by the execution of the Quantized autoencoder network 130. The Encoder convolutional neural network module 140 can reduce the dimensions of the input image 210 through learned filters. An implementation of the Encoder convolutional neural network module 140 is shown in FIG. 3. FIG. 3 is a flowchart showing the input image X that can be compressed multiple times by passing through the compression blocks. The Encoder convolutional neural network module 140 upon execution by the processor can fed the input image data into the compression block 310 of the encoder 140 where a series of filters can be applied to the original image. In one implementation, the compression block 310 can include filters such as Strides Conv2D 320, Conv2D 330, Batch Normalization 340, and ELU Activation 350.

The most common type of convolution that can be used is the 2D convolution layer, abbreviated as conv2D. A filter or a kernel in a conv2D layer has a height and a width. These kernels are generally smaller than the input image, so should be moved across the whole image. Conv2D is known in the art and Strided define an overlap between applying operations, strided conv2d can specify if what is the distance between consecutive applications of convolutional filters. Batch normalization is a popular and effective technique that consistently accelerates the convergence of deep networks. The ELU filter or Exponential Linear Unit is a function that tends to converge cost to zero faster and produce more accurate results. Different from other activation functions, ELU has an extra alpha constant which should be a positive number. One novel aspect of using filters in the encoder module of this invention is that the filter configuration is flexible. FIG. 3 shows three consecutive blocks 310, however, the detailed structure of the encoder module may not be fixed but can grow throughout the training process. The compression ratio can increase fourfold for each growth stage. The growth of the encoder model 140 may also depend on the performance during training. If the model is capable of handling the current compression rate with sufficient accuracy and fidelity, then the model can be further strained by adding another compression block.

Figure 4:
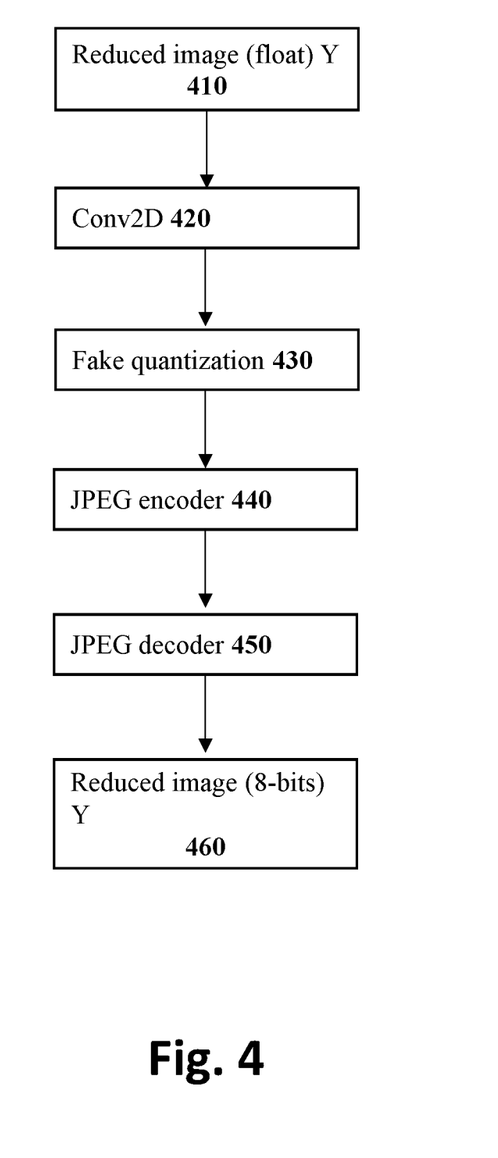
FIG. 4 is a diagram illustrating the Bottleneck network, according to an exemplary embodiment of the present invention.

Again, referring to FIG. 2, the bottleneck module 150 can receive the encoder's output i.e., the unquantized compression representation of the input image data. The bottleneck module 150 upon execution by the processor can apply quantization with a custom gradient function to allow for gradient flow. Referring to FIG. 4 which illustrates an implementation of the bottleneck module 150, a novel aspect of this invention is that the bottleneck network module utilizes fake quantization to allow quantization to occur during the training process. Fake quantization is a feature known in the art and commercially available. TensorFlow which is a free and open-source software library for machine learning and artificial intelligence utilizes fake quantization module. The quantization using a fake quantization module allows for gradient flow through the quantization process. The criteria for when to add another compression block are part of the novelty of this invention. The specific compression blocks to add are yet another novel aspect of this invention. This reduced image can be further reduced via one or more traditional codecs such as OCT/JPEG 2000, or losslessly via the image file format PNG (Portable Network Graphics). The output of the bottleneck network is a reduced image representation of the input image data. FIG. 4 shows the reduced image (float) Y 410 which is the output of the encoder network and received by the bottleneck network 150, a Conv2D filter 420, a fake quantization module 430, a secondary encoder 440, a secondary decoder 450, and an output of the bottleneck network which is a quantized reduced image (8-bits) Y 460.

Figure 5:
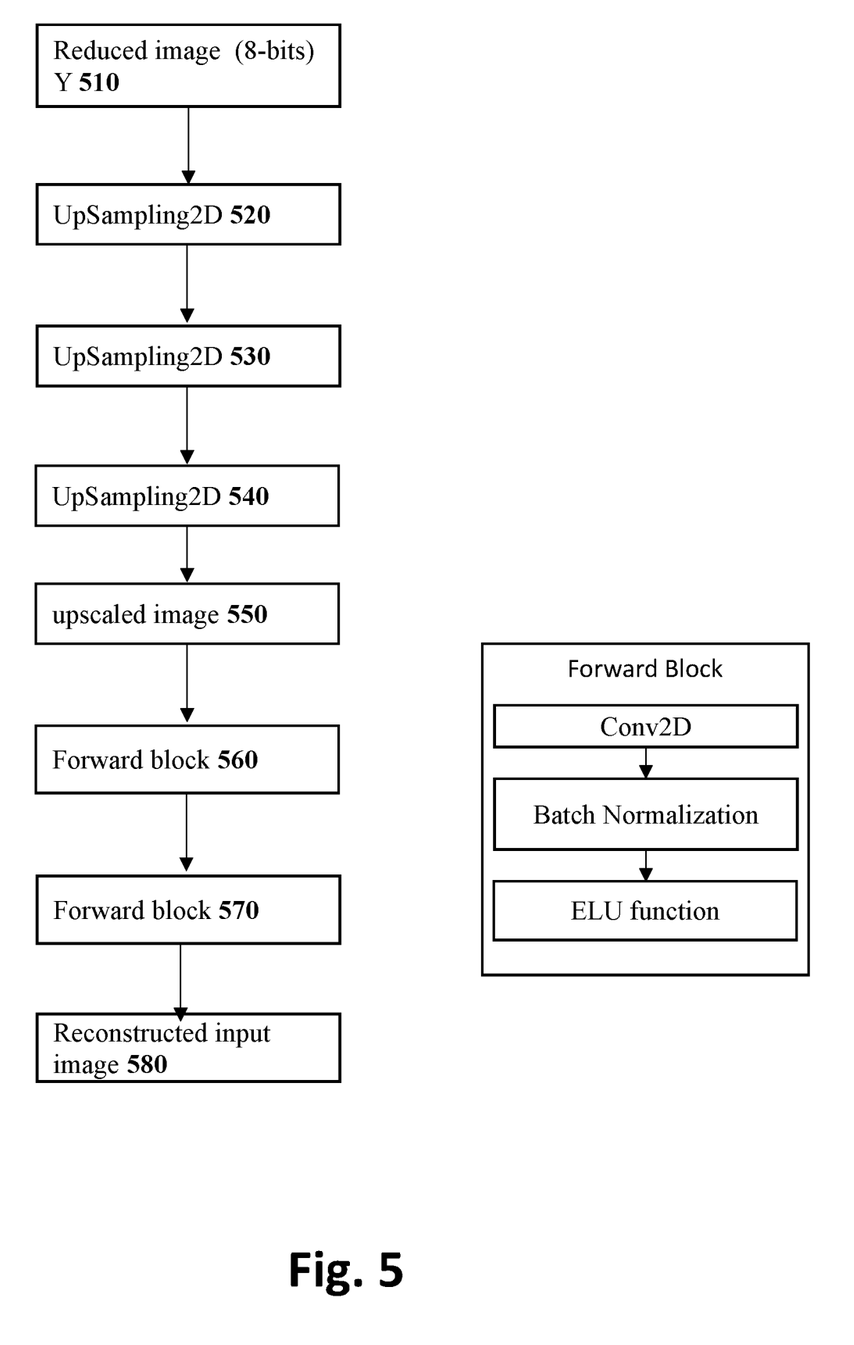
FIG. 5 is a diagram illustrating the Decoder network including detail of the Residual Building Blocks module, according to an exemplary embodiment of the present invention.

Again, referring to FIG. 2 which shows the decoder module 160 can receive the compressed quantized representation from the bottleneck network 150. The decoder network 160 can reconstruct the quantized compressed representation of the input image data. As shown in FIG. 5, which shows an implementation of the decoder network 160, the decoder network 160 can initially upscale the code image N times, where N is the current number of compression blocks. The upscaled image can then be fed through a residual network with a number of residual blocks. In one example, ten forward blocks can be in the residual network. The upscaled image forks at the start and is summed to the output of the last residual output, allowing for gradient flow to the encoder and bottleneck networks. This network effectively accounts for the JPEG (joint photographic experts group) compression losses and increases the quality of the output image. FIG. 5 shows the reduced image (8-bits) Y obtained from the bottleneck network, upSampling2D function 520, upSampling2D function 520, and upSampling2D function 540 all connected in series as shown in FIG. 5, upscaled image 550, forward block 560, forward block 570, and the reconstructed image 580. The forward block is also illustrated in FIG. 5 including the Conv2D filter, Batch normalization filter, and the ELU function.

Greedy Training: The compression ratio of the model in this invention grows throughout the training process. By continuing to grow the compression ratio through the training process, no matter the dataset that is used, the model can achieve a superior compression ratio with minimal losses in the image quality and fidelity.

Composite Loss function: In the training phase, the following are the loss or objective functions to minimize:

$$L_{reconstruction} = \frac{1}{N}\sum (f(x) - x)^2$$

$$L_{compression} = \frac{1}{N}\sum (\hat{Y} - Q)^2$$

Where the total loss of our Network is:

$$L_{total} = L_{reconstruction} + L_{compression}$$

Where N in both cases is the total number of data points in the squared term, this loss function is known as the mean squared error, f(x) is the function representing the whole model, wherein x is the input image. The output of this function is the final reconstructed image. Y is the output of the bottleneck network, and Q is the input of the JPEG compression layer.

While the reconstruction loss is widely known in prior art, the disclosed codec includes the compression loss. By including compression loss, the encoder network is able to change the input image to better fit the JPEG compression algorithm and thus reduce the losses caused by the compression.

Figure 6:
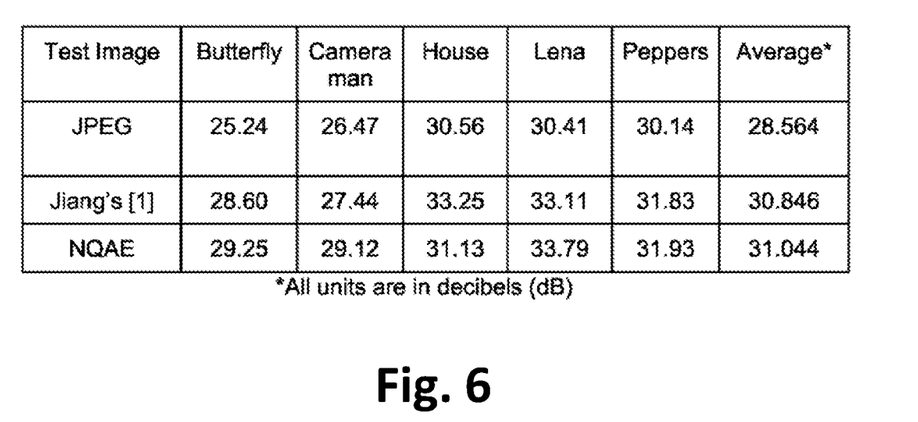
FIG. 6 is a table showing results of a PSNR comparison between the performance of the disclosed model with the performance of a known model.
Figure 7:
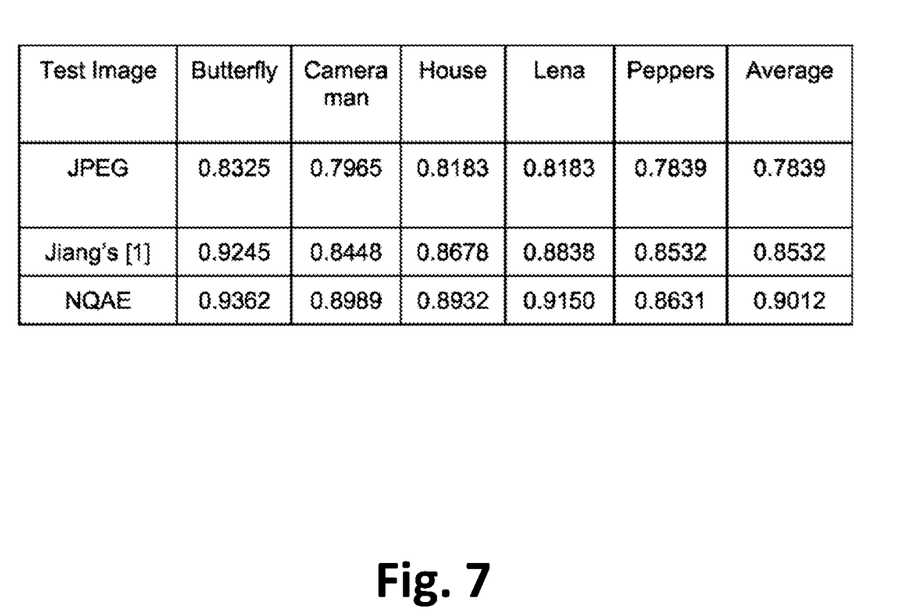
FIG. 7 is a table showing results of a SSIM comparison between the performance of the disclosed model with the performance of a known model.

Advantages and benefits of the invention include speed and performance. The performance of the model which is the subject of this invention was tested on the same dataset as that of Feng Jiang, et al., *An End-to-End Compression Framework Based on Convolutional Neural Networks*, IEEE transactions on circuits and systems for video technology, Aug. 2, 2017. This particular dataset is used as a benchmark for a majority of works in this field. Thus, the performance of the model which is the subject of this invention can be compared fairly with previous state-of-the-art solutions. The results of such a comparison are shown in FIG. 6. The model which is the subject of this invention is abbreviated as NQAE (Novel Quantized Auto Encoder). The known model is referred to as Jiang's. The performance of the NQAE model was significantly better than the previous state of the art solution in comparison as shown in FIG. 6. The comparison used the PSNR (Peak Signal to Noise Ratio) image quality metric. The performance of the NQAE model was substantially superior as measured by the structural similarity index metric, as shown in FIG. 7.

The encoder's compression ratio grows dynamically throughout the training process. The benefit of this aspect of the invention is that no matter what dataset is input, the model can achieve a superior compression ratio with meager losses in the image quality and fidelity as compared to all known existing solutions.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A method for dynamic compression of image data with high compression ratio and high fidelity, the method implemented in a system comprising a processor and a memory, the method comprising the steps of:
   constructing a convolution neural network based quantized autoencoder network comprising an encoder network, a bottleneck network, and a decoder network,
      wherein the encoder network comprises one or more convolution compression blocks each having two convolution layers, the encoder network upon execution by the processor receives an input image data and reduces dimensions of the input image data by dynamic processing the input image data using the one or more convolution compression blocks in series,
      wherein the bottleneck network upon execution by the processor receives an unquantized compression representation of the input image data as an output of the encoder network, wherein the bottleneck network comprises fake quantization module, a secondary encoder, and a secondary decoder,
      wherein the decoder network upon execution by the processor receives a quantized compressed representation of the input image data as an output of the bottleneck network, restructure the quantized compressed representation of the input image data to obtain a compressed output image, the decoder network comprises a plurality of forward blocks.

2. The method according to claim 1, wherein the one or more convolution compression block comprises a Conv2D filter and an exponential linear unit (ELU) filter connecting in a series.

3. The method according to claim 1, wherein the encoder network is configured to grow in layers by adding further one or more of the convolution compression blocks in series, wherein a compression ratio increases fourfold for each growth stage.

4. The method according to claim 3, wherein the encoder network has a compression ratio of (16×2n):1, where n is a number of the one or more convolution compression blocks in the encoder network.

5. The method according to claim 4, wherein the encoder network is trained by supervised Greedy layer-wise Pretraining to dynamically derive a value of n.

6. The method according to claim 5, wherein the method further comprises the steps of:
   upscaling the quantized compressed representation of the input image data, by the decoder network, upon execution by the processor, for n number of times, by subjecting to n layers of UpSampling2D layer.

7. The method according to claim 1, wherein the secondary encoder is a JPEG encoder, and the second decoder is a JPEG decoder.

8. A system for dynamic compression of image data with high compression ratio and high fidelity, the system comprising a processor and a memory, the system configured to implement a method comprising the steps of:
   constructing a convolution neural network based quantized autoencoder network comprising an encoder network, a bottleneck network, and a decoder network,
      wherein the encoder network comprises one or more convolution compression blocks each having two convolution layers, the encoder network upon execution by the processor receives an input image data and reduces dimensions of the input image data by dynamic processing the input image data using the one or more convolution compression blocks in series,
      wherein the bottleneck network upon execution by the processor receives an unquantized compression representation of the input image data as an output of the encoder network, wherein the bottleneck network comprises fake quantization module, a secondary encoder, and a secondary decoder,
      wherein the decoder network upon execution by the processor receives a quantized compressed representation of the input image data as an output of the bottleneck network, restructure the quantized compressed representation of the input image data to obtain a compressed output image, the decoder network comprises a plurality of forward blocks.

9. The system according to claim 8, wherein the one or more convolution compression block comprises a Conv2D filter and an exponential linear unit (ELU) filter connecting in a series.

10. The system according to claim 8, wherein the encoder network is configured to grow in layers by adding further one or more of the convolution compression blocks in series, wherein a compression ratio increases fourfold for each growth stage.

11. The system according to claim 10, wherein the encoder network has a compression ratio of (16×2n):1, where n is a number of the one or more convolution compression blocks in the encoder network.

12. The system according to claim 11, wherein the encoder network is trained by supervised Greedy layer-wise Pretraining to dynamically derive a value of n.

13. The system according to claim 12, wherein the method further comprises the steps of:
   upscaling the quantized compressed representation of the input image data, by the decoder network, upon execution by the processor, for n number of times, by subjecting to n layers of UpSampling2D layer.

14. The system according to claim 8, wherein the secondary encoder is a JPEG encoder, and the second decoder is a JPEG decoder.

* * * * *